United States Patent [19]

Mueller

[11] Patent Number: 4,728,722

[45] Date of Patent: Mar. 1, 1988

[54] PREPARATION OF POLYOXYBUTYLENE POLYOXYALKYLENE GLYCOLS HAVING A NARROW MOLECULAR WEIGHT DISTRIBUTION AND A REDUCED CONTENT OF OLIGOMERIC CYCLIC ETHERS

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 13,675

[22] Filed: Feb. 12, 1987

[30] Foreign Application Priority Data

Feb. 28, 1986 [DE] Fed. Rep. of Germany ....... 3606479

[51] Int. Cl.$^4$ ............................................. C08G 65/20
[52] U.S. Cl. ...................................... 528/413; 528/416; 528/417; 568/617; 568/624
[58] Field of Search ...................... 528/413, 416, 417; 568/617, 624

[56] References Cited

U.S. PATENT DOCUMENTS

| 4,228,272 | 10/1980 | Del Pesco | 528/413 |
| 4,251,654 | 2/1981 | Robinson et al. | 528/417 |
| 4,303,782 | 12/1981 | McHale et al. | 528/416 |
| 4,306,058 | 12/1981 | Copelin | 528/498 |
| 4,329,445 | 5/1982 | Del Pesco | 528/416 |
| 4,500,705 | 2/1985 | Copelin | 528/417 |
| 4,564,671 | 1/1986 | Mueller | 528/416 |
| 4,585,592 | 4/1986 | Mueller | 568/617 X |

FOREIGN PATENT DOCUMENTS 0006107 11/1983 European Pat. Off. .
3346136 7/1985 Fed. Rep. of Germany .
854958 11/1960 United Kingdom .

*Primary Examiner*—Earl Nielsen
*Attorney, Agent, or Firm*—John H. Shurtleff

[57] ABSTRACT

A process for the batchwise preparation of polyoxybutylene polyoxyalkylene glycols by copolymerizing tetrahydrofuran with a 1,2-alkylene oxide in the presence of compounds containing reactive hydrogen, the polymerization being carried out over a bleaching earth catalyst or zeolite catalyst, and the 1,2-alkylene oxide being fed to the reaction mixture in such manner that the concentration of the 1,2-alkylene oxide in the reaction mixture is kept at below 2% by weight during the polymerization.

8 Claims, 1 Drawing Figure

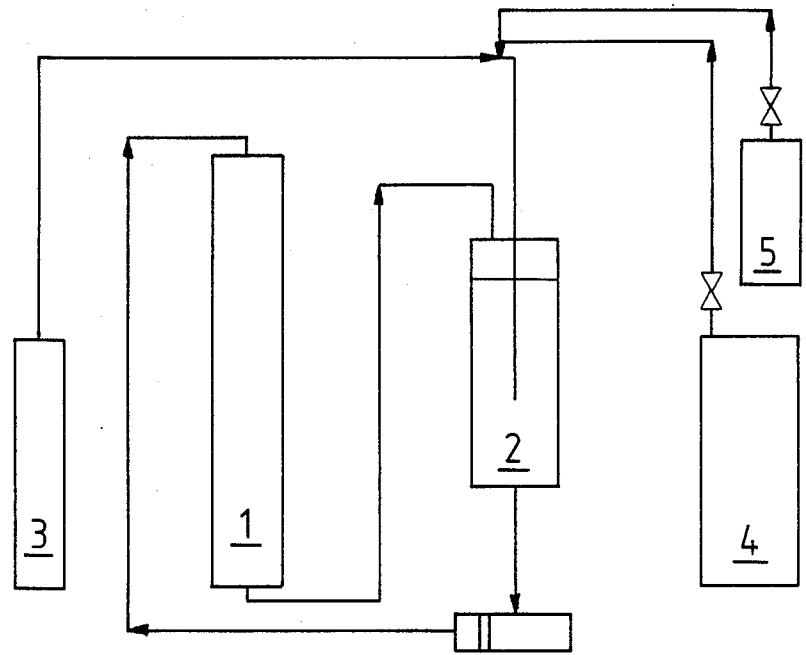

PREPARATION OF POLYOXYBUTYLENE POLYOXYALKYLENE GLYCOLS HAVING A NARROW MOLECULAR WEIGHT DISTRIBUTION AND A REDUCED CONTENT OF OLIGOMERIC CYCLIC ETHERS

The present invention relates to a process for the batchwise preparation of polyoxybutylene polyoxyalkylene glycols by copolymerizing tetrahydrofuran with 1,2-alkylene oxides over bleaching earth catalysts, wherein copolymers having particularly narrow molecular weight distribution and a low content of oligomeric cyclic ether contaminants are obtained.

British patent No. 854,958 describes a process for copolymerizing tetrahydrofuran and alkylene oxides, wherein the polymerization is carried out in the presence of compounds containing reactive hydrogen and over bleaching earth catalysts. In this process, relatively large amounts of low molecular weight products, consisting predominantly of oligomeric cyclic ethers, are obtained as byproducts. The molecular weight distribution of the polyoxybutylene polyoxyalkylene glycols is very broad. It can, depending on the mean molecular weight, correspond to a heterogeneity quotient $M_w/M_n$ of 3–4 for the molecular weight range of 1,000 to 2,000 ($M_w$=weight-average molecular weight and $M_n$=number-average molecular weight).

The oligomeric cyclic ethers are undesirable contaminants in the polymers, since they are an inert material and lower the quality of the final polymers produced from the polymeric glycols. For example, the inert material lowers the mechanical properties of the polyurethanes produced from the copolymers. The oligomers may exude at the surface of the finished products or become extracted by solvents, thereby interfering with the dimensional stability of the moldings. Various proposals for reducing the content of these oligomers have already been made. For example, EP-A-6107 proposes treating the copolymers with an activated montmorillonite at an elevated temperature. This process, in which the oligomeric cyclic ethers are subjected to an expensive depolymerization in the presence of the desired polymers, does not achieve quantitative removal of the cyclic ethers. To avoid these disadvantages, U.S. Pat. No. 4,127,513 proposes using, as catalyst, a specially activated montmorillonite which is formed by acid-activating the bleaching earth with more highly concentrated acids, so that the exchangeable alkali metal ions and alkaline earth metal ions are almost completely replaced by hydrogen. Disadvantages of this process are the high color number of the polymers, the relatively low rate of polymerization and the fact that the content of oligomeric cyclic ethers is still as much as 5–6% by weight.

A further proposal for improving the copolymerization of alkylene oxides with tetrahydrofuran under the catalytic action of activated bleaching earth is to be found in U.S. Pat. No. 4,228,272. It provides the use of bleaching earths having a particular specific pore volume, a defined catalyst surface area and a defined pore diameter. Supposedly, this process gives products having an improved color number, at an increased polymerization rate. However, the oligomer content of the products is about 4% by weight (compare column 5, lines 14 and 15) and accordingly too high for use of the copolymers to produce polyurethanes which have to meet severe mechanical requirements. As is known, all processes for copolymerizing alkylene oxides with tetrahydrofuran in the presence of bleaching earths give high molecular weight copolymers with terminal hydroxyl groups, the copolymers always being contaminated by a greater or lesser content of macrocyclic polyethers without hydroxyl groups. Hence, it has also been proposed to remove the cyclic ethers by an extraction with hydrocarbons, water or supercritical gases (U.S. Pat. Nos. 4,500,705, 4,251,654 and 4,306,058).

German Laid-Open Application DOS No. 3,346,136 describes a process for copolymerizing alkylene oxides and tetrahydrofuran, in which the formation of cyclic oligomeric ethers can be repressed to below 2% by weight by carrying out the polymerization continuously in a reactor and introducing, into the circulated reaction mixture, less than 30% by weight of fresh feed of tetrahydrofuran and 1,2-alkylene oxide. A disadvantage of this process is that the polymers formed have a broad molecular weight distribution. Thus, the heterogeneity quotient $M_w/M_n$ is greater than 4. Polyurethanes and also polyesters which are produced from these broad-distribution copolymers having a relatively high content of high molecular weight products are unsuitable for many applications. Crystallization phenomena and phase separation in the finished product (manifesting itself in clouding and opalescence) lower their mechanical properties.

It is an object of the present invention to provide a process for the preparation of high quality copolymers from tetrahydrofuran and 1,2-alkylene oxides, in which the formation of significant amounts of oligomeric cyclic ethers is avoided and copolymers having a narrow molecular weight distribution, corresponding to $M_w/M_n$ of from 1.5 to 2.8 for molecular weights of from 1,000 to 2,000, are obtained.

We have found that this object is achieved if tetrahydrofuran is polymerized batchwise with a 1,2-alkylene oxide in the presence of compounds containing reactive hydrogen over a bleaching earth or zeolite catalyst, the 1,2-alkylene oxide being fed to the reaction mixture in such manner that the concentration of the 1,2-alkylene oxide in the reaction mixture is kept below 2% by weight during the polymerization.

Suitable 1,2-alkylene oxides may be substituted or unsubstituted. Examples of substituents are linear or branched alkyl of 1 to 6, preferably 1 or 2, carbon atoms, phenyl which is unsubstituted or substituted by alkyl and/or alkoxy of 1 or 2 carbon atoms or by halogen, or halogen atoms, preferably chlorine. Examples of particularly suitable 1,2-alkylene oxides are 1,2-butylene oxide, 2,3-butylene oxide, styrene oxide, epichlorohydrin and, preferably, ethylene oxide and 1,2-propylene oxide. The 1,2-alkylene oxides may be used individually or as mixtures, for example a mixture of ethylene oxide and 1,2propylene oxide.

Examples of suitable compounds containing reactive hydrogen are water, monohydric and polyhydric alcohols, eg. methanol, ethanol, propanol, ethylene glycol, butylene glycol, glycerol, neopentyl glycol and 1,4-butanediol, and especially carboxylic acids of 1 to 8 carbon atoms. Polyether-alcohols and polyetherglycols, such as polytetramethylene ether glycol (PTHF), may also be used as compounds containing active hydrogen in the copolymerization. The compounds containing reactive hydrogen are employed in amounts of 0.5–10 mol %, based on the tetrahydrofuran. The simplest and most economical version of the process results if water is used. Water and polyhydric alcohols lead to the formation of polyether-alcohols which may be bifunctional or polyfunctional. Since the use of carboxylic acids results in polymeric half-esters, the copolymers containing ester groups are subjected to a conventional hydrolysis, for example by heating the copolymers with an aqueous alkali metal hydroxide in the presence or absence of an inert solvent or preferably by, for example, methods described in U.S. Pat. No. 2,499,725 or in J. Am. Chem. Soc. 70 (1948), 1842, by subjecting the copolymers to a transesterification, for example with methanol, under the catalytic action of an alkali metal alcoholate.

The bleaching earths to be used as catalysts are described in, for example, Ullmann's Enzyklopädie der technischen Chemie, 3rd edition, volume IV, pages 541–545. They are natural or synthetic bleaching earths, such as aluminum hydrosilicates or aluminum magnesium hydrosilicates of the montmorillonite type, which have been converted by acid into the hydrogen ion form and are commercially available, for example under the trademark ®Tonsil. Synthetic bleaching earths are described in, for example, British patent No. 854,958. Synthetic zeolite aluminosilicates, such as the commercial catalyst KC-Perlkator ® D 10, in the protonized form, are also suitable catalysts. Bleaching earths or synthetic zeolites may, depending on their process of manufacture, contain amounts of water varying from about 1 to 7% by weight. On drying above 100° C., these catalysts lose the adsorbed water, but avidly readsorb it on exposure to the atmosphere, since they are hygroscopic. Bleaching earth catalysts having a water content of less than 0.5, preferably less than 0.1, and especially less than 0.05, % by weight are particularly suitable for performing the process according to the invention. Natural bleaching earths are preferred to synthetic aluminosilicates as catalysts for the process according to the invention.

The process according to the invention is carried out batchwise over solid bleaching earth or zeolite catalysts. In order to bring the mixture of tetrahydrofuran, 1,2-alkylene oxide and compound containing active hydrogen into intimate contact, either the solid catalyst is agitated in the starting components or the mixture of reactants is agitated relative to the static solid catalyst.

The first of these cases makes use of, for example, stirred vessels in which the catalyst is suspended. In the second case, the procedure followed is, for example, to pass the mixture of the reactants over the fixed catalyst. The second version of the process is preferred for various reasons, for example because it permits accurate temperature control and results in a catalyst-free reaction mixture.

In order to be able to use the catalyst as a fixed catalyst in the reactor, the procedure followed is, for example, to knead a commercial water-containing bleaching earth with, for example, binders, especially water, and form moldings therefrom by pressing. The water-containing moldings are then dehydrated at above 100° C., preferably at from 150° to 700° C., under atmospheric pressure or reduced pressure, if appropriate in the presence of a gas which is inert under reaction conditions, for example a noble gas such as helium or argon or especially nitrogen. After dehydration, the water content of the catalyst moldings is less than 0.5% by weight, but is preferably reduced to less than 0.2% by weight. The bleaching earth moldings may be in the shape of, for example, spheres, rings, cylinders or tablets. When spherical bleaching earth moldings are used, the spheres in general have a diameter of from 2 to 15 mm, preferably from 3 to 5 mm. Cylindrical moldings in general have a length of from 2 to 15 mm and a diameter of from 2 to 6 mm. Non-spherical and non-cylindrical moldings in general have a volume corresponding to that of the cylindrical moldings. Ring-shaped or star-shaped compression moldings, which combine a very large surface area with low resistance to flow may also be employed advantageously.

The catalyst moldings are arranged in a fixed manner in the reactor, for example by simple pouring in. The catalyst bed through which the reaction mixture flows does not require regeneration even after prolonged operation, since the catalyst moldings retain their original solid shape and do not suffer abrasion. The catalysts are distinguished by low loss of activity and have virtually unlimited life.

Suitable reactors for the process according to the invention are, for example, columnar reaction vessels which have any desired shape of cross-section, for example square or elliptical. The use of elongate cylindrical reaction vessels is advantageous. The ratio of internal diameter to length of reaction vessel is in general from 1:2 to 1:100, preferably from 1:10 to 1:40. The reactors may be arranged vertically or horizontally, or in intermediate positions. However, if the exothermicity is to be removed in the reaction vessel, preferred reactors are vertical tubular furnaces in which the tube diameter is about 10–100 mm. If the temperature is to be regulated by a heat exchanger built into an external circuit, the reactor can also be a shaft furnace.

The mixture of starting materials is passed through the reactor by means of, for example, a circulating pump. The concentration of alkylene oxide in the reaction mixture during the polymerization is kept at below 2% by weight, advantageously at from 0.1 to 1% by weight and especially at from 0.1 to 0.5% by weight. At the same time, steps are taken to ensure substantially constant concentration of the alkylene oxide in the reaction mixture, namely a concentration which does not show more than 10% deviation. The reaction mixture is circulated by pumping until the desired degree of conversion is achieved. The reaction time during which the reaction mixture is pumped over the catalyst in the reactor can be varied within relatively wide limits depending on the desired copolymer composition. If, for example, it is desired to obtain a copolymer which finally contains about 20% by weight of alkylene oxide, and if the alkylene oxide concentration in the reaction mixture is kept constant at from 0.2 to 0.5% by weight throughout the reaction, then about 50% by weight conversion is reached after about 5–10 hours provided the ratio of catalyst volume to reaction mixture circulated per hour is roughly in the ratio of from 1:1 to 1:5. At the same time, the ratio of total volume of reactants to catalyst volume is from 5:1 to 1:1. The required reaction time is inversely proportional to the alkylene oxide concentration employed in the reaction mixture.

The tetrahydrofuran and 1,2-alkylene oxide starting materials are advantageously employed in a very pure form, thereby ensuring long catalyst life. Before the polymerization, the tetrahydrofuran can be purified by a pretreatment with strong mineral acids, organic sulfonic acids, silicates and, preferably, bleaching earths, using the process described in European Laid-Open Application No. 3,112. Different 1,2-alkylene oxides, as well as mixtures of different compounds containing active hydrogen, may be employed simultaneously in a reaction batch.

The molar ratio of the amounts of tetrahydrofuran and 1,2-alkylene oxide employed is, for example, from 15:1 to 2:1, preferably from 10:1 to 5:1. It is important to ensure that upon addition of the 1,2-alkylene oxide the concentration of the latter in the mixture remains below 2% by weight. It is advisable to keep the molar ratio of the two monomers present over the catalyst substantially constant over the greater part of the reaction time, preferably over 80–99% of the total reaction time. Only during a post-reaction time can the concentration of alkylene oxide be allowed to drop to 0 through complete reaction. The desired constancy of alkylene oxide concentration in the reaction mixture is achieved by feeding the alkylene oxide into the monomer mixture at the same rate as its concentration diminishes by polymerization in the reaction batch. The amount of alkylene oxide polymerized over the entire polymerization time can vary within very wide limits. Copolymers which can be converted to valuable end products contain, for example, from 5 to 50, especially from 10 to 30, % by weight of alkylene oxide. Preferably, the alkylene oxide has been converted completely after completion of the reaction, while excess tetrahydrofuran, which in the absence of alkylene oxide does not continue to react over the catalyst, remains in the mixture as a solvent for the copolymer. The polymer concentration in the tetrahydrofuran is, for example, from 30 to 60% by weight.

The copolymerization over the fixed catalyst bed or in the agitated catalyst bed is advantageously carried out at from 0° to 70° C., preferably from 30° to 50° C., under atmospheric pressure. However, higher reaction temperatures, for example from 70° to 90° C., may also be employed. However, because of the low solubility of, for example, ethylene oxide at high temperatures it is advantageous to carry out the copolymerization under slightly superatmospheric pressure.

In the preferred embodiment, the mixture of starting materials to be copolymerized is passed through the reactor, and the reaction mixture leaving the reactor is restored, by renewed addition of alkylene oxide, to the desired, substantially constant, concentration. The compound containing reactive hydrogen is in most cases added by adjusting its concentration in the tetrahydrofuran at the start of the reaction. However, if desired, the compound containing reactive hydrogen can also be added continuously, though in general this measure is not employed. The reaction mixture, which is continuously kept at a substantially constant alkylene oxide concentration, is circulated over the catalyst bed until the desired amount of alkylene oxide, which is subsequently to be present in the copolymer, has been fed into the predetermined amount of tetrahydrofuran.

In general, the reaction time thus required to give a reaction mixture containing, for example, 50% by weight of copolymer, is from 2 to 20, preferably from 4 to 10, hours. The stationary alkylene oxide concentration in the reaction mixture is low and is in general advantageously kept at from 0.1 to 2% by weight, as described above. Hence, only a short post-reaction time is required in order to bring the concentration of alkylene oxide in the reaction mixture down to the limit of detection. After a post-reaction time of from 1 to 3 hours, the alkylene oxide concentration is in general close to 0. If this post-reaction stage, which leads to a slight broadening of the molecular weight distribution, is to be dispensed with in order to obtain a polymer having an extremely narrow distribution, alkylene oxide can, after the polymerization has been completed and the catalyst separated off, be removed by distillation.

Since no further reaction occurs in the reaction mixture which has been separated from the catalyst bed, there ultimately remains a copolymer solution in tetrahydrofuran, generally containing from about 30 to 70% of copolymer. The latter is isolated in pure form by evaporating the unconverted tetrahydrofuran, which can be reused for a fresh polymerization.

The copolymerization is exothermic. Accordingly, constancy of temperature is assured by cooling the reactor or the stream of the reaction mixture which is circulated outside the reactor by pumping.

The products obtained from the copolymerization, especially those having molecular weights of from 300 to 5,000, are outstandingly suitable for the preparation of polyurethanes or polyesters. If carboxylic acids are used as starter molecules (i.e. compounds having reactive hydrogen atoms) in the copolymerization, half-esters are first formed, and these are then hydrolyzed, as described above, to the glycols, before the reaction with diisocyanates or dicarboxylic acids. The finished polymers prepared from the copolymer have good mechanical properties coupled with good low temperature behavior, microbial resistance and resistance to hydrolysis. Compared to homopolymeric polytetramethylene ether glycol the copolymers have a lower solidification point and a lower viscosity. They can accordingly be processed further without additional liquefaction or melting process.

The process according to the invention has the considerable advantage that during the copolymerization virtually no byproducts and in particular only very low proportions of cyclic oligomers are formed and that the reaction can be taken to complete conversion of the 1,2alkylene oxide and of the compound having reactive hydrogen. The lower the alkylene oxide concentration in the reaction mixture, the lower is the formation of undesired oligomeric ethers and the lower is the heterogeneity of the copolymers. Though these important advantages are achieved by lengthening the reaction time, this fact is not a significant economic disadvantage, especially since the reaction space is of low specific cost. Unexpectedly—and not directly explicable on the basis of experience in the polymerization field—the copolymers prepared according to the invention have a very narrow molecular weight distribution which for example in the case of polymers having a molecular weight of 1,000–1,500 corresponds to a heterogeneity quotient $M_w/M_n$ of from 1.6 to 2.2. This is unexpected because, in general, continuous polymerization results in polymers with narrower molecular weight distribution than those obtained from batchwise polymerization. Thus, for example, polymers having a molecular weight of 1,000–1,500 and obtained by continuous polymerization have an average heterogeneity quotient $M_w/M_n$ of from 3.5 to 4.5.

Polymers with a narrow molecular weight distribution are in particular more suitable, in further processing to polyurethanes or polyesters, for obtaining products having valuable mechanical properties than are starting materials which have a very heterogeneous molecular weight distribution. Another unexpected feature is that the process according to the invention gives copolymers having an extremely low color number. This is unexpected because it is known to those skilled in the art that alkylene oxide polymers obtained by cationic polymerization are in most cases deeply colored. The copolymers have 2 equivalents of hydroxyl groups per molecule. Astonishingly, the products are almost 100% bifunctional though it is known that alkylene oxide polymers in most cases do not exhibit a high degree of bifunctionality.

Astonishingly, the use of dried bleaching earth (water content less than 0.5% by weight) gives particularly advantageous results though the polymerization is carried out in the presence of water, for example using the latter as the compound containing reactive hydrogen. Inexplicably, the rate of reaction drops if bleaching earth containing, for example, from 1 to 5% by weight of water is used.

It is an important advantage of the process that the reaction mixtures, which contain the copolymers in concentrations of from 40 to 60%, merely require freeing from excess tetrahydrofuran in order to be usable for their final application, for example the preparation of polyurethanes, provided a brief post-reaction time has been allowed to ensure that the alkylene oxide has reacted completely. The tetrahydrofuran, which can advantageously be removed by distillation under reduced pressure, can be reused for the reaction without requiring a purification step.

The Examples which follow illustrate the process according to the invention without implying any limitation. Parts are parts by weight and bear the same relation to parts by volume as that of the kilogram to the liter.

EXAMPLE 1 (see FIGURE)

Commercial technical-grade tetrahydrofuran was purified as described in Example 1 of European patent No. 3,112. Extrudates of 2-3 mm diameter and 4 mm average length were produced from bleaching earth commercially obtainable under the trademark ®Tonsil Optimum FF from Süd-Chemie AG, Munich, Federal Republic of Germany, and were dried for 4 hours at 200° C. and 40 mbar. After this, the water content measured by the Fischer method was 0.03%.

The polymerization was carried out in an apparatus of which the principle is shown in the FIGURE. The dried extrudates were introduced into a reaction tube (1), provided with a thermostatically controlled cooling jacket and having a capacity of 5,000 parts by volume and a diameter:length ratio of about 1:10. The stock vessel (2) having a useful volume of 7,000 parts by volume was charged with 5,000 parts of purified tetrahydrofuran, 43 parts of water and 20.3 parts of ethylene oxide. In doing so, the tetrahydrofuran, water and ethylene oxide were taken from the corresponding reservoirs (4), (5) and (3). This mixture of the starting compounds was charged onto the catalyst bed (1), which was kept at 47°-49° C. As soon as the catalyst bed had been filled with fresh feed, the same amount of fresh feed was prepared yet again in the stock vessel and was then passed continuously over the catalyst bed. The overflow returned to the stock vessel (2). By continuously introducing ethylene oxide gas from the reservoir (3) into the feed mixture in the stock vessel (2), constancy of the ethylene oxide concentration, at 0.4% by weight, in the stock vessel (2) was assured. This required introducing gaseous ethylene oxide corresponding to 35 parts per hour. After a reaction time of 9 hours, 315 parts of ethylene oxide had been introduced into the reaction mixture. The reaction mixture was then allowed 4 hours of post-reaction at the reaction temperature. During this time the reaction mixture was circulated from the stock vessel (2) over the catalyst (1) at a pumping rate of 15 liters/hour, which was kept constant through the duration of the experiment. After this post-reaction time, the ethylene oxide concentration in the feed mixture was 0. The total amount of ethylene oxide employed and reacted was 315 parts.

5,350 parts of reaction mixture were discharged from the stock vessel (2). This first reaction mixture was discarded. The stock vessel was subsequently recharged with 5,500 parts of fresh feed, consisting of 98.3% of tetrahydrofuran, 0.7% of water and 0.4% of ethylene oxide. This mixture was then circulated through the catalyst bed (1) by pumping at a rate of 12,000 parts by volume per hour. At the same time, 35 parts of gaseous ethylene oxide per hour were introduced into the reaction vessel (1), resulting in the ethylene oxide concentration in the stock vessel being kept at 0.4%. After 9 hours, the ethylene oxide feed was stopped. The reaction mixture continued to be circulated by pumping for 4 hours at an hourly rate of 12,000 parts by volume. The reaction product in the stock vessel (2) was discharged and the stock vessel was recharged, as described above, with the mixture of tetrahydrofuran, water and ethylene oxide. The polymerization was then performed as described above for 9 hours, with a further 4 hours allowed for post-reaction. The reaction mixture thus obtained hardly differed from that discharged from a further 100 polymerization batches of this type.

To isolate the copolymer, the colorless reaction mixture (color number <5 APHA) was evaporated, first under atmospheric pressure and then under reduced pressure, namely 1 mbar, in a film evaporator, at up to 200° C. The distillate obtained comprised 98% of pure tetrahydrofuran and 2% of low molecular weight copolymer having an average molecular weight of about 250. From the amount of copolymer obtained by evaporation, the conversion of the tetrahydrofuran employed was calculated to be 45%. The ethylene oxide employed had been converted completely and was present quantitatively in the copolymer obtained, which contained about 15% by weight of ethylene oxide units. From the hydroxyl number of the copolymer, its molecular weight was calculated to be 1,260. The heterogeneity of the copolymer, determined by gel permeation chromatography, was $M_w/M_n = 1.7$.

EXAMPLE 2

195 parts of the bleaching earth extrudates described in Example 1 were introduced into a thermostatically controlled stirred reaction vessel of 2,000 parts by volume reaction capacity. The reaction vessel was then charged with a mixture of 950 parts of tetrahydrofuran and 40 parts of formic acid. 10 parts of propylene oxide per hour were then uniformly introduced into the mixture over 5 hours, with stirring. This kept the propylene oxide concentration in the reaction mixture constant at a value of . . . % by weight. The reaction temperature was 50° C. After all the propylene oxide had been added, stirring was continued for 4 hours at the reaction temperature. The copolymer solution obtained was separated from the catalyst by filtration. The filtrate was free from propylene oxide and contained 43% of copolymer and 57% of unconverted tetrahydrofuran, as ascertained by evaporation under atmospheric pressure and under reduced pressure. The solvent-free copolymer had a hydrolysis number of 37 mg of KOH and a hydroxyl number of 13 mg of KOH/g. The product contained less than 1% of cyclic oligomeric ethers. The ester-containing polymer was then mixed with an equal amount of methanol and with 10 parts of calcium hydroxide, and was transesterified to the glycol by distillation under a column with 20 theoretical plates, the methyl formate being distilled off under atmospheric pressure, at 32° C. After transesterification was complete, the calcium hydroxide used as the transesterification catalyst was filtered off and the methanol solution of the copolymer was completely evaporated down on a film evaporator, initially under atmospheric pressure and subsequently under reduced pressure. The polymer obtained was an ester-free, pure glycol having an OH number of 51 mg of KOH/g, corresponding to a molecular weight of 2,210. The $^{13}$C NMR spectrum showed that the copolymer had been formed from about 10% of propylene oxide and 90% of tetrahydrofuran. The heterogeneity, $M_w/M_n$ of the product was about 1.8.

We claim:

1. In a process for the batchwise preparation of polyoxybutylene polyoxyalkylene glycols by copolymerizing tetrahydrofuran with a 1,2-alkylene oxide in the presence of compounds containing reactive hydrogen, the polymerization being carried out over a bleaching earth catalyst or zeolite catalyst, and any copolymers containing ester groups which may be formed being hydrolyzed, the improvement which comprises feeding the 1,2-alkylene oxide to the reaction mixture in such a manner that the concentration of the 1,2-alkylene oxide in the reaction mixture is kept below 2% by weight during the polymerization.

2. A process as claimed in claim 1, wherein the concentration of the 1,2-alkylene oxide in the reaction mixture is kept substantially constant.

3. A process as claimed in claim 1, wherein ethylene oxide and/or 1,2-propylene oxide is used as the 1,2-alkylene oxide.

4. A process as claimed in claim 1, wherein the molar ratio of the tetrahydrofuran employed to the total 1,2-alkylene oxide introduced into the reaction is kept at from 15:1 to 2:1.

5. A process as claimed in claim 1, wherein the copolymerization is carried out at from 0° to 70° C. under atmospheric pressure.

6. A process as claimed in claim 1, wherein water is used as the compound containing reactive hydrogen.

7. A process as claimed in claim 1, wherein a carboxylic acid is used as the compound containing reactive hydrogen.

8. A process as claimed in claim 1, wherein a bleaching earth/zeolite catalyst having a water content of less than 0.5% by weight is used.

* * * * *